Figures 1, 2:
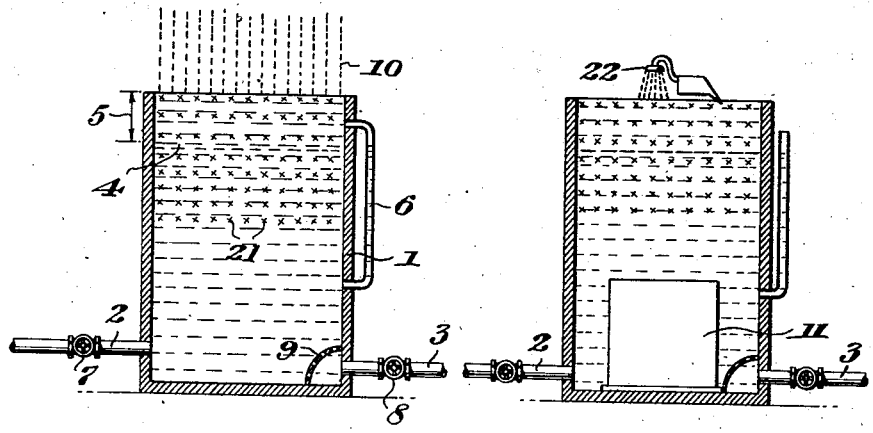

April 6, 1943.　　　G. B. AX ET AL　　　2,315,762
METHOD OF AND APPARATUS FOR SEPARATING CRYSTALS FROM SOLUTIONS
Filed Jan. 31, 1942

Inventor
George Bernhard Ax
Kurt Helmet Grunewald
Oscar Anton Wiberg
and Erik Oman,
By Pierce & Sheffler
Attorneys Patented Apr. 6, 1943

2,315,762

UNITED STATES PATENT OFFICE 2,315,762

METHOD OF AND APPARATUS FOR SEPARATING CRYSTALS FROM SOLUTIONS

Georg Bernhard Ax and Kurt Helmut Grunewald, Finspong, Oscar Anton Wiberg, Borggard, and Erik Öman, Stocksund, Sweden; said Ax, said Grunewald, and said Wiberg assignors to said Öman Application January 31, 1942, Serial No. 429,126 In Sweden January 9, 1941

11 Claims. (Cl. 62—124)

When concentrating a solution of a substance in a solvent by a freezing-out process a mixture of crystals of the solvent and a more concentrated solution of the substance in the solvent is obtained. This method of concentrating a solution is often more advantageous than methods involving the evaporation of the solvent by heating the solution. The freezing-out method, however, has not as yet been put to large-scale use in the art because it is difficult, in large-scale operation, to separate the concentrated solution from the crystals without prohibitive losses and simultaneously diluting the concentrated solution to a substantial degree. The large quantities of materials to be worked up when operating on a technical scale necessitate simple methods for handling the materials, and for this reason a separation of the concentrated solution from the crystals by an ordinary centrifugation, for instance, is not suitable.

The present invention has for its object to obviate these difficulties. The invention is mainly characterized by the fact that the crystals formed through the freezing-out process, said crystals being assumed to be lighter than the solution, are separated from the solution by causing them to rise to the surface of the solution and to form there a crystal body or mass which is freed from accompanying solution by means of a washing liquid supplied from above, the topmost layer of said crystal body being removed for instance by scraping.

As stated, the method is based on the fact that the crystals are lighter than the solution so that they collect on the surface of the liquid where they form a homogeneous body which may attain a considerable depth. The difference between the specific gravity of the solution and that of the crystals may be relatively large. Thus for example, in aqueous solutions the specific gravity of ice is 0.92 and that of a concentrated solution about 1.2.

The method may be applied not only to aqueous solutions but to solutions generally. The solution should, however, have such a high concentration that the specific gravity thereof substantially exceeds the specific gravity of the solvent in the solid state.

In order to obtain the desired result the crystals in the solution should not freeze together but remain in the form of separate crystals and the crystal body should be permeable to washing liquid supplied from above. By exhaustive researches and tests in large-scale operation, aqueous solutions being used, it has been found that bodies of ice crystals possess these qualities.

The invention also comprises an apparatus adapted for the carrying out of the method. Such apparatus will be described in the following, reference being had to the attached drawing which shows a few embodiments, in connection with which other characteristic features of the invention will be disclosed.

Figure 3:
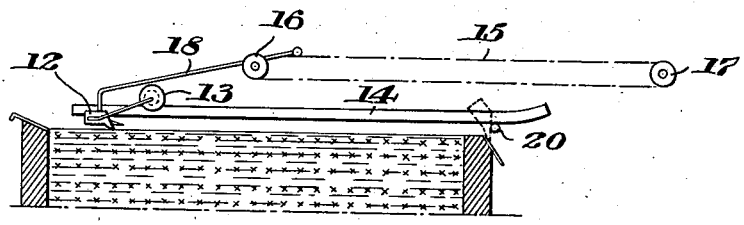
Figures 4, 5:
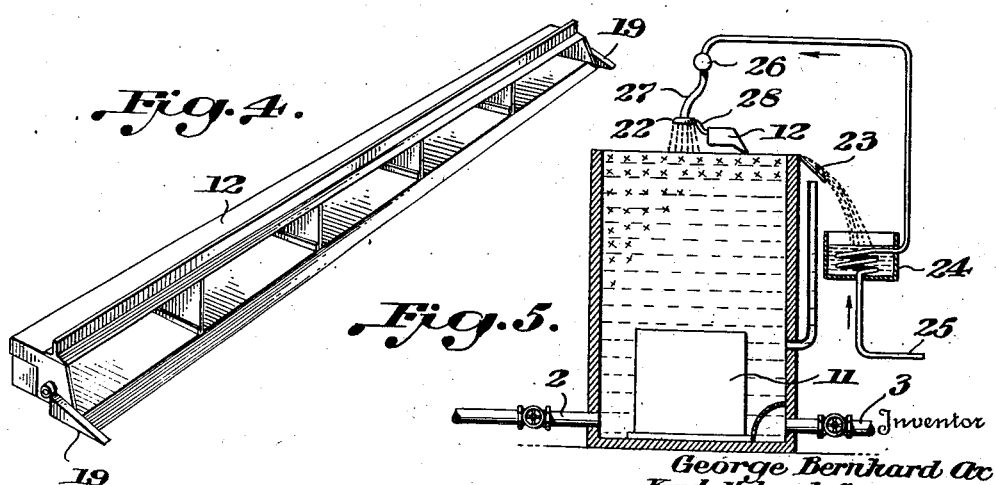

Fig. 1 shows diagrammatically a vertical section of a separating vessel; Fig. 2 shows diagrammatically a vertical section of a separating vessel containing a refrigerating unit, and Fig. 3 shows, on a larger scale, a vertical section of the top portion of a separating vessel provided with a scraping device. A perspective view of a scraper of the scraping device is shown in Fig. 4. Fig. 5 is a more or less diagrammatic vertical section of an apparatus including means for cooling the washing liquid.

As shown in Fig. 1 the apparatus comprises a receptacle 1 which is open at the top. A mixture of crystals and concentrated solution is fed into the receptacle through the supply pipe 2. The freezing has been effected in another vessel (not shown). Thus the separating vessel is used in combination with a separate freezing-out vessel. The crystals 21, being lighter than the solution, rise to the surface, the solution flowing off through the outlet 3 (if desired being returned to the freezing-out vessel). The level of the solution is indicated by the dotted line 4. As shown in Fig. 1 the level 4 lies below the upper edge of the receptacle where the scraping off takes place. The difference in height is designated by 5. As the uppermost layers of the crystal body rise above the edge or rim of the receptacle they are scraped off by means of a suitable scraping device.

The level of the solution may be observed in the sight glass 6 and is controlled by means of valves 7 and 8 or an overflow (not shown).

By suitable devices, for instance a screen 9, it is possible to prevent crystals from escaping together with the solution flowing off through outlet 3.

When a crystal body having a thickness as represented by 5 is obtained over the level of the liquid the solution accompanying the crystals will drain off from said crystals. If the upward movement of the crystals is slow the draining-off time will be long, and the crystals will be freed from liquid to a considerable extent, although not completely. A quantity of solution amounting to $\frac{1}{10}$ to $\frac{1}{4}$ of the weight of the crystals will remain on the surfaces of the crystals.

In order to improve the results and to effect a complete removal of solution from the crystals the spontaneous draining-off is combined with a washing of the crystal body from above. Such washing is carried out in such a manner that a solvent, e. g. water, the original solution or diluted solution or mixtures of the latter is supplied to the top surface of the crystal body. The dotted lines 10 in Fig. 1 represent a shower of washing liquid being supplied. Prior to the supply of the washing liquid it is preferably cooled, e. g. by means of the crystals removed by scraping (see Fig. 5).

The washing also has another purpose. When freezing out crystals from concentrated solutions some of the solute is frozen into the crystals as inclusions. This is especially the case in the treatment of highly concentrated salt solutions, e. g. sea water, and solutions of sulfates. The salts occurring as inclusions are, however, completely dissolved during the washing according to the invention.

The washing liquid supplied does not descend into the concentrated solution but forms a layer thereon, due to its specific gravity being lower. Some mixing of the washing liquid with the concentrated solution at its upper surface occurs thereby forming a transitional layer between the concentrated solution and the washing liquid. Thus one obtains a body of liquid in which the concentration varies and through which the crystal mass slowly rises. The interstices between the crystals form minute passages in the crystal mass preventing a mixing of washing liquid and concentrated solution. Instead a displacement is obtained which closely approaches ideal conditions.

The crystal body is raised by the crystals forming from below. The top layer of the growing crystal body is removed by scraping off or cutting off. This is effected at regulated intervals so as to obtain a suitable thickness of the layer to be scraped off. The crystal mass removed comprises crystals and washing liquid. If the washing is well managed the crystal mass scraped off comprises substantially the entire quantity of washing liquid, so that only a small quantity thereof descends into the concentrated solution, diluting the upper layer of the latter. By controlling the level difference 5, the quantity of crystals supplied from below the body as well as the quantity of washing liquid supplied by the showers, very satisfactory washing results may be obtained.

In contradistinction to the old washing methods the crystals according to the present invention rise to the surface through the liquid layer below the crystal mass passing through zones where the concentration decreases in an upward direction.

Water or dilute sulfite waste liquor may be mentioned as examples of washing liquid to be used in the concentration of sulfite liquor by freezing-out processes. Such sulfite waste liquor is obtained in large quantities in connection with the washing of sulfite pulp in the pulp tanks. In the concentration of sea water the washing is preferably carried out by means of sea water. During the washing procedure usually a very small quantity of the washing liquid descends into the solution being concentrated, which is introduced through the pipe 2. In certain cases it may, however, be preferable to supply, as washing liquid, the whole quantity of the solution to be concentrated. When this is done the freezing of solution is carried out only after said solution has passed through the crystal body.

Fig. 2 shows a device provided with a refrigerator 11 for the freezing out of solvent. The refrigerator is preferably located in the lower part of the receptacle. The crystals which freeze on the surfaces of the refrigerator are removed therefrom and rise to the crystal body above. In this embodiment the original solution may be supplied through the crystal body and/or through the pipe 2, and concentrated solution may be drawn off through a pipe or by an overflow by means of which the height of the layer being washed is controlled.

If, however, the liquid rises above the desired level it is not absolutely necessary to draw off more solution. If the concentration is unsatisfactory the supply may be decreased in order to restore the desired level and the desired concentration. This control may obviously be carried out automatically.

The crystals may be removed by means of the reciprocating scraping device 12 (Fig. 3). It is preferred to supply the washing liquid immediately after the scraping off, by means of a shower device 22, which follows the movement of the device 12. In this way the washing is effected intermittently. The washing liquid may, however, be supplied continuously.

The method is especially adapted for solutions having a high viscosity such as highly concentrated sulfite liquor, where it is difficult to separate the viscous liquor from the ice crystals in an economical way. Expressing the liquor from a mass of crystals is impractical because the mixture of liquor and ice crystals is very greasy and viscous. Removal of the liquor by merely allowing it to flow off gives equally bad results because the flowing off is very slow and, moreover, incomplete. By the process according to the invention good results are, however, obtained and the ice crystals will be well washed already while ascending through the washing liquid even if the ice crystals are frozen out from a highly concentrated sulfite liquor. It is easy to separate sulfite liquor having a concentration of 25 to 27° Bé. If the washing is slow a still higher concentration may be used.

Fig. 3 shows a non-limitative embodiment of the scraping device. The scraper 12 is carried on rolls 13 by the rail 14. The reciprocating movement is obtained by means of the chain or wire 15 guided by the rolls 16, 17, the scraper being connected with the chain 15 through the bar 18. At the two extreme ends of the scraper overturning members 19 are provided which are shown more clearly in Fig. 4. When the scraper has been drawn over the crystal body and has collected a crystal layer the members 19 at the extreme position engage below the abutments or journals 20, the scraper overturning and discharging the mass transported thereby as indicated by the dash-dotted lines in Fig. 3. During the return stroke the scraper is kept lifted above the crystal body by the bar 18, the latter moving along with the chain in the lower part of its cycle.

The cooling of the washing liquid before it is sprayed on the crystals at the top of receptacle 1 is illustrated in Fig. 5 of the drawing.

The crystals discharged by the scraper 12 fall through a chute 23 into vessel 24, enclosing the coiled portion of pipe 25 through which washing liquid flows to nozzle 26 which communicates with spray head 22 by means of a hollow flexible tube 27. Spray head 22 is connected with the scraper 12 by means of member 28 and follows the movement of said scraper, the washing being thus effected intermittently, the washing liquid acting on the crystal body during the whole interval between two successive discharge strokes of the scraper which enhances the washing effect.

The removal by scraping may also be carried out by means of a rotating scraper, the vertical wall of the receptacle then preferably being cylindrical and the scraper arranged in such a manner that its centre of rotation coincides with the central axis of the cylinder. After one revolution of the scraper one layer of the crystal mass has been scraped off. By means of a transport worm or the like the scraped-off mass is carried towards the periphery.

The growth of the crystal body from below is not always equally large over the entire surface of the said body. Ordinarily such differences as may occur are compensated by the fact that the buoyancy increases at such places where the body is larger. A compensation or an adjustment of the lower surface of the crystal body may, if necessary, also be effected by means of a rotating scraping device.

When treating solutions of low concentration it may be economically advantageous to divide the freezing-out process into two or more stages. In such cases the washing may take place during a later stage by means of solution from a preceding stage, if necessary with the alternating use of a solvent, such as pure water.

What we claim is:

1. A method of concentrating solutions, comprising the steps of freezing out part of the solvent to form crystals, floating said crystals upwardly in a vessel containing solution to a point of discharge from said vessel, washing the crystals while at said point of discharge and removing the crystals from said point of discharge, and withdrawing solution freed of said crystals from said vessel.

2. A method according to claim 1, in which the level of the solution is kept below the point of discharge of the crystals so as to obtain and maintain a body of crystals above the level of the solution, said body being carried by the solution and the crystals therein, solution accompanying the crystals being partly drained off and partly displaced by the washing liquid supplied at said point of discharge.

3. A method according to claim 1, in which the washing liquid comprises original solution.

4. A method according to claim 1, in which the washing liquid comprises diluted original solution.

5. A method according to claim 1, in which the washing liquid is cooled by means of crystals discharged, prior to its being supplied to the crystals to be washed.

6. A method according to claim 1, in which the supply of washing liquid to the crystals is controlled so as not to exceed that quantity which is necessary for displacing solution accompanying the crystals, substantially all of the washing liquid being carried along with the crystals discharged, a small portion only passing into the solution.

7. A process according to claim 1, in which all of the solution to be concentrated is supplied to the crystals as washing liquid.

8. A method according to claim 1 in which the freezing-out process is carried out in at least two stages and the washing liquid used in one stage comprises solution withdrawn from another stage.

9. An apparatus for carrying out the method defined in claim 1, comprising a receptacle open at the top and provided with a feed conduit and a discharge conduit at its lower portion, means for supplying washing liquid to the crystals floated upwardly through the receptacle, and movable means for scraping off washed crystals at the upper portion of said receptacle.

10. An apparatus for carrying out the method defined in claim 1, comprising a receptacle open at the top and provided with a feed conduit and a discharge conduit at its lower portion, means for supplying washing liquid to the crystals floated upwardly through the receptacle, movable means for scraping off washed crystals at the upper portion of said receptacle, and a refrigerator disposed in the lower portion of the receptacle.

11. An apparatus for carrying out the method defined in claim 1, comprising a receptacle open at the top and provided with a feed conduit and a discharge conduit at its lower portion, means for supplying washing liquid to the crystals floated upwardly through the receptacle, and movable means for scraping off washed crystals at the upper portion of said receptacle, said means for supplying washing liquid being adapted to follow the movement of the scraping-off means.

GEORG BERNHARD AX.
KURT HELMUT GRUNEWALD.
OSCAR ANTON WIBERG.
ERIK ÖMAN.